(12) United States Patent
Dietrich et al.

(10) Patent No.: US 7,388,322 B2
(45) Date of Patent: Jun. 17, 2008

(54) ILLUMINATION DEVICE FOR MICROSCOPES

(75) Inventors: Peter Dietrich, Oberkochen (DE); Jan Buchheister, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 119 days.

(21) Appl. No.: 10/340,293

(22) Filed: Jan. 10, 2003

(65) Prior Publication Data

US 2003/0156322 A1    Aug. 21, 2003

(30) Foreign Application Priority Data

Jan. 11, 2002    (DE) ............... 102 02 870

(51) Int. Cl.
*H01J 5/16* (2006.01)
*F21V 29/00* (2006.01)
*G02B 21/06* (2006.01)

(52) U.S. Cl. .............. 313/111; 313/113; 362/575; 362/268; 359/385; 359/289

(58) Field of Classification Search ........... 313/578, 313/573, 110–113; 359/379–382; 362/31, 362/263, 265, 804
See application file for complete search history.

(56) References Cited

U.S. PATENT DOCUMENTS

| 2,471,879 | A |   | 5/1949 | Lowber et al. |
| 3,428,800 | A | * | 2/1969 | Lemons ............... 362/309 |
| 4,106,851 | A |   | 8/1978 | Considine et al. |
| 4,964,692 | A | * | 10/1990 | Prescott ............... 385/117 |
| 4,998,810 | A | * | 3/1991 | Sander et al. ............ 359/389 |
| 5,046,838 | A | * | 9/1991 | Iwasaki ................ 353/101 |
| 5,068,515 | A | * | 11/1991 | van den Bergh et al. ......... 219/121.73 |
| 5,395,362 | A | * | 3/1995 | Sacharoff et al. .......... 600/108 |
| 5,418,583 | A | * | 5/1995 | Masumoto ............... 353/38 |
| 5,548,182 | A |   | 8/1996 | Bunk et al. |
| 5,566,019 | A |   | 10/1996 | Stankewitz |
| 5,734,498 | A | * | 3/1998 | Krasieva et al. ........... 359/387 |
| 5,777,784 | A | * | 7/1998 | Tanaka ................. 359/388 |
| 5,971,577 | A | * | 10/1999 | Mori et al. .............. 362/575 |
| 6,061,133 | A | * | 5/2000 | Freischlad .............. 356/460 |
| 6,099,146 | A | * | 8/2000 | Imamura et al. .......... 362/293 |
| 6,259,562 | B1 | * | 7/2001 | Shie et al. .............. 359/599 |
| 6,396,628 | B1 | * | 5/2002 | Osa et al. ............... 359/385 |
| 6,523,985 | B2 | * | 2/2003 | Hamanaka et al. ......... 362/554 |
| 6,593,996 | B2 | * | 7/2003 | Battarel et al. ............. 355/44 |
| 6,796,697 | B1 | * | 9/2004 | Rosengaus et al. ......... 362/554 |
| 6,857,752 | B2 | * | 2/2005 | Eckhardt ................. 353/97 |
| 6,899,451 | B2 | * | 5/2005 | Kittelmann et al. ........ 362/538 |
| 2003/0071991 | A1 | * | 4/2003 | Sander ................. 356/230 |

FOREIGN PATENT DOCUMENTS

| CH | 514855 |   | 10/1971 |
| DE | 19946594 A1 | * | 4/2001 |
| EP | 663684 |   | 10/2006 |
| JP | 07-174974 A | * | 7/1995 |
| JP | 11339503 |   | 10/2006 |

* cited by examiner

*Primary Examiner*—Sikha Roy
(74) *Attorney, Agent, or Firm*—Reed Smith LLP

(57) ABSTRACT

The invention is directed to an illumination device for microscopes which is provided with a halogen lamp with a reflector and a filament extending in direction of the optical axis and a scatter disk and which enables a homogeneous illumination of the visual field without additional optical components.

8 Claims, 2 Drawing Sheets

ILLUMINATION DEVICE FOR MICROSCOPES

CROSS-REFERENCE TO RELATED APPLICATION

This application claims priority of German Application No. 102 02 870.2, filed Jan. 11, 2002, the complete disclosure of which is hereby incorporated by reference.

BACKGROUND OF THE INVENTION a) Field of the Invention

The invention is directed to an illumination device for microscopes which is suitable particularly for brightfield illumination.

b) Description of the Prior Art

The object of an illumination device for microscopes is to illuminate the visual field completely and uniformly. Since practically all of the light sources that are used generate an inhomogeneous light distribution in the visual field or in the planes conjugate to the visual field, corresponding steps must be taken to make the illumination homogenous. In microscopy, special halogen lamps are usually employed. These special halogen lamps have filament surfaces arranged vertical to the optical axis of the illumination device and have the largest possible illumination surface, although the latter is generally rectangular or square, that is, deviates from the circular shape of the visual field or conjugate fields. It is known to project the image of the filament surface directly next to or at a slight offset to the filament by means of a suitable reflector so as to generate an increase in the luminous area or a reduced filament structuring of the luminous area. However, the homogeneity of the illumination obtained in this way is often still not sufficient to meet the requirements for microscopy that are necessary in particular for applying Köhler illumination. Therefore, a large number of suggestions have been made for the elimination of this disadvantage. These suggestions generally consist in introducing special optical elements into the beam path, which special optical elements themselves do not have a homogeneously distributed light transparency. It is known from AT-PS 183 246 to arrange a matt surface with a circular non-matt surface portion in the beam path. DE 41 02 507 discloses a deflector disk having a plurality of individual prisms which are uniformly distributed over the entire surface and which image the light source in the aperture stop plane with a plurality of secondary images. EP 613 569 describes a raster disk with a plane-parallel outer area allowing an unobstructed passage of light and a circular inner area which is formed as a raster which images the light source multiple times. It is known from DE 198 32 665 to use a graduated gray filter having a radial grayscale graduation that is radially symmetric with respect to its center and in which the absorption coefficient of the filter decreases toward the edge. The light intensity which generally falls off toward the outer side according to the cosine law is compensated in this way. In order to realize this grayscale graduation, the text proposes arranging small opaque surface elements on a glass disk in such a way that the local surface ratio between the applied surface elements and the uncoated glass disk determines the transmittance of the filter. Since all of the proposed solutions still generate small residual inhomogeneities of the light intensity in the visual field, a scatter disk is usually used in addition to blur these inhomogeneities.

All of these known solutions have a number of disadvantages. For example, the production of these raster plates or filters is complicated and therefore expensive. The special halogen lamps with rectangular filament surfaces that are used are also relatively expensive. A considerable portion of the light energy is lost through the additional optical elements arranged in the beam path, which leads to the use of higher-output lamps which, in turn, give off increased heat and accordingly require additional steps for eliminating this heat.

OBJECT AND SUMMARY OF THE INVENTION

Therefore, it is the primary object of the invention to overcome the disadvantages of the prior art and to provide a homogeneous illumination for microscopes which can be implemented in a simple manner.

This object is met, according to the invention, in an illumination device for microscopes comprising a halogen lamp with a reflector and a scatter disk. The lamp and scatter disk are arranged in the beam path of the halogen lamp between the conjugate locations of the luminous field and the pupil.

The inventors have surprisingly determined that the special optical elements such as raster disks, prisms, and graduation filters known from the prior art can be dispensed with and a sufficiently homogeneous illumination can be realized simply by means of a commercially available halogen lamp and a scatter disk. A lamp of this kind is, for example, the Decostar 48865 SP manufactured by Osram. These lamps have an approximately parabolic reflector constructed of individual facets and a filament extending along the optical axis. Usually, these lamps are used as spot lamps which generate a relatively sharply limited light cone (in this case, 10°). At a distance of approximately 150-210 mm from the light exit opening, these lamps have a luminous density distribution with a darker center and a brightened circular outer area. According to the invention, a scatter disk which is suitably positioned in the beam path compensates this luminous density distribution and results in a homogeneous illumination of the visual field. Therefore, this scatter disk does not have the blurring function for local inhomogeneities which is described in the prior art but, rather, has a compensating effect on a rotationally symmetric luminous density graduation.

Further, the illumination device according to the invention makes do without collecting optics which are usually required for illumination devices based on the Köhler principle.

The invention will be described in the following with reference to preferred embodiment examples.

DESCRIPTION OF THE PREFERRED EMBODIMENTS

Figure 1:
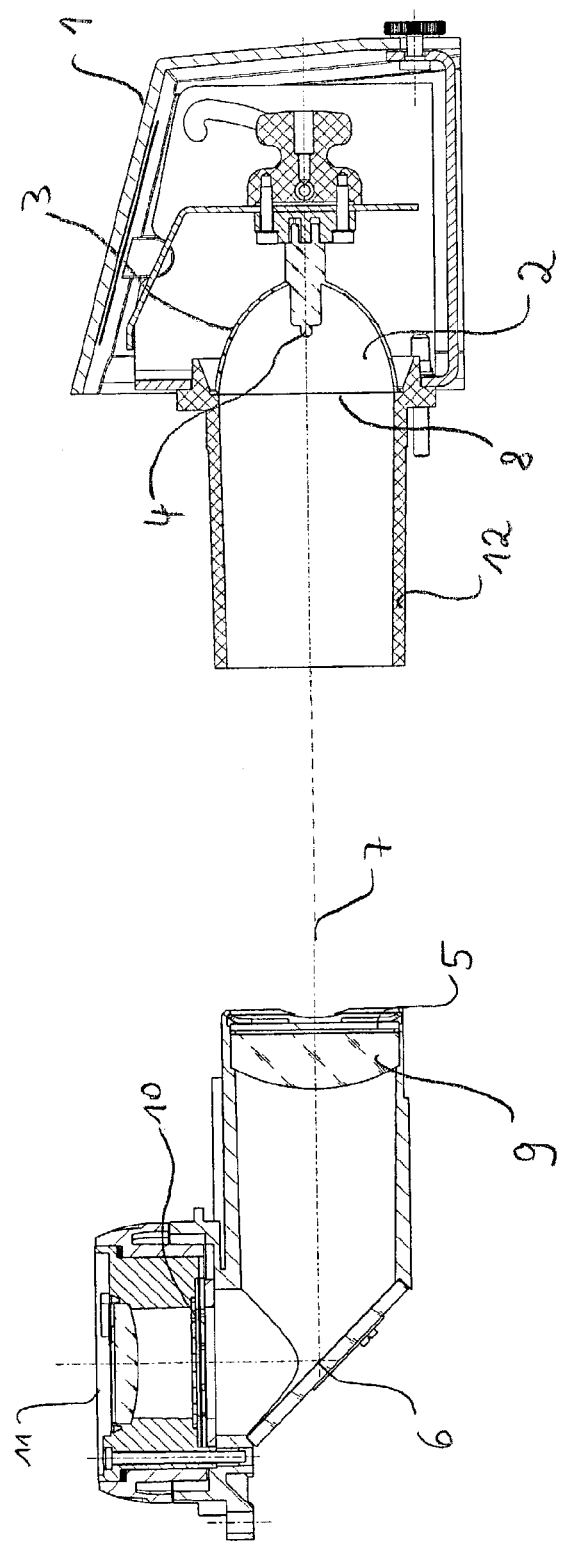
FIG. 1 shows a schematic view of the illumination device according to the invention.

FIG. 1 shows a transmitted illumination device for a microscope comprising a lamp housing 1, a halogen lamp 2 with a reflector 3 and a filament 4, and a scatter disk 5. A deflecting mirror 6 serves to couple the light into the microscope. The filament 4 extends along the optical axis 7 of the lamp 2. A lens 9 which serves to focus the light surface in the condenser entrance pupil is arranged in the vicinity of the scatter disk 5. The field diaphragm 10 and a cover glass 11 serving to protect against dust are provided in the beam path after the deflecting mirror 6. A pipe or tube 12 serves to suppress the scattered light.

In a first embodiment example with a Decostar 48865 SP halogen lamp, manufactured by Osram, with a radiating angle of 10° and a diameter of 51 mm, the optimal distance between the exit aperture 8 of the halogen lamp 2 and the scatter disk 5 is 185 mm. In this connection, a scatter disk with a diameter of 42 mm and a half-power angle of 2.5° was used.

In a second embodiment example using a Decostar 48865 FL halogen lamp, manufactured by Osram, with a radiating angle of 24° and a diameter of 51 mm, the optimal distance for the same scatter disk characteristics is 130 mm.

In a third embodiment example using a Decostar 48865 WFL halogen lamp, Osram, with a radiating angle of 38° and a diameter of 51 mm, the optimal distance is 90 mm for the same scatter disk characteristics.

Figure 2:
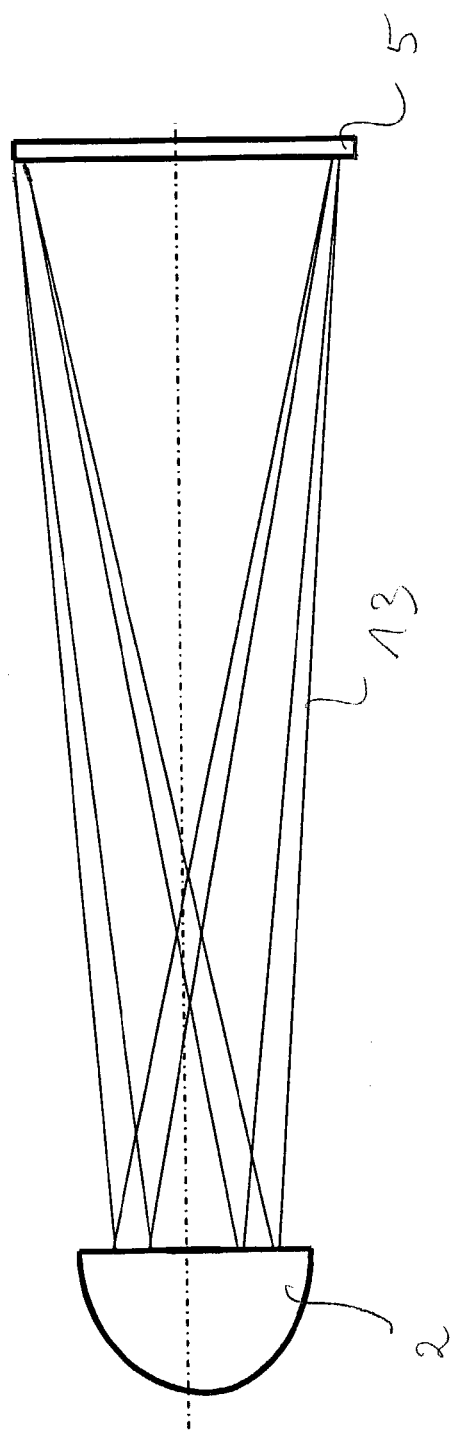
FIG. 2 shows for purposes of illustration a schematic view of the beam shape of a halogen lamp with a reflector and a filament oriented parallel to the optical axis.

The beam ratios in the illumination device according to the invention are shown schematically in a highly simplified manner in FIG. 2. It will be seen that starting from the halogen lamp 2, the light beams 13 are concentrated in an outer area of the light cone, which leads to a light distribution with darker center and brightened edge. As was surprisingly found by the inventors, this light distribution can be homogenized in a simple manner by a scatter disk 5 to the extent that the requirements for the quality of illumination based on the Köhler principle are met in an excellent manner.

The invention is not limited to the embodiment examples shown herein. There may be different values for the optimal positioning of the scatter disk for halogen lamps other than those mentioned above. The use of a scatter disk with different characteristics can also lead to different optimal positions.

While the foregoing description and drawings represent the present invention, it will be obvious to those skilled in the art that various changes may be made therein without departing from the true spirit and scope of the present invention.

What is claimed is:

1. An illumination device for microscopes comprising:
   a halogen lamp with a parabolic reflector; and
   a scatter disk;
   said lamp and scatter disk being arranged in the beam path of the halogen lamp between conjugate locations of the luminous field and the pupil of the microscope;
   wherein light beams from the halogen lamp are concentrated in an outer area of a light cone and the light beams are homogenized by the scatter disk and
   wherein the illumination device homogenizes the light beams without collecting optics between the lamp and the scatter disk.

2. The illumination device for microscopes according to claim 1, wherein the halogen lamp has a filament extending in direction of the optical axis of the reflector.

3. The illumination device for microscopes according to claim 1, wherein the halogen lamp has a radiating angle of approximately 10° and the scatter disk is arranged at a distance of between 150 and 210 mm from the light exit opening of the halogen lamp.

4. The illumination device for microscopes according to claim 1, wherein the halogen lamp has a radiating angle of approximately 10° and the scatter disk is arranged at a distance of about 185 mm from the light exit opening of the halogen lamp.

5. The illumination device for microscopes according to claim 1, wherein the halogen lamp has a radiating angle of approximately 24° and the scatter disk is arranged at a distance of between 110 and 150 mm from the light exit opening of the halogen lamp.

6. The illumination device for microscopes according to claim 1, wherein the halogen lamp has a radiating angle of approximately 24° and the scatter disk is arranged at a distance of about 130 mm from the light exit opening of the halogen lamp.

7. The illumination device for microscopes according to claim 1, wherein the halogen lamp has a radiating angle of approximately 38° and the scatter disk is arranged at a distance of between 80 and 110 mm from the light exit opening of the halogen lamp.

8. The illumination device for microscopes according to claim 1, wherein the halogen lamp has a radiating angle of approximately 38° and the scatter disk is arranged at a distance of about 90 mm from the light exit opening of the halogen lamp.

* * * * *